US012388959B2

(12) United States Patent
Cutri et al.

(10) Patent No.: US 12,388,959 B2
(45) Date of Patent: Aug. 12, 2025

(54) UNDERWATER CAMERA SYSTEM

(71) Applicant: UAM Tec Pty Ltd, Melbourne (AU)

(72) Inventors: Alex Cutri, Melbourne (AU); Sugan Shrestha, Melbourne (AU); Matthew Harrison, Melbourne (AU); Thanh Le, Melbourne (AU)

(73) Assignee: UAM Tec Pty Ltd, Port Melbourne (AU)

( * ) Notice: Subject to any disclaimer, the term of this patent is extended or adjusted under 35 U.S.C. 154(b) by 143 days.

(21) Appl. No.: 18/040,461

(22) PCT Filed: Aug. 5, 2021

(86) PCT No.: PCT/AU2021/050857
§ 371 (c)(1),
(2) Date: Feb. 3, 2023

(87) PCT Pub. No.: WO2022/027102
PCT Pub. Date: Feb. 10, 2022

(65) Prior Publication Data
US 2023/0291873 A1    Sep. 14, 2023

(30) Foreign Application Priority Data

Aug. 5, 2020 (AU) ................ 2020902751

(51) Int. Cl.
H04N 7/18 (2006.01)
H02J 1/00 (2006.01)
(Continued)

(52) U.S. Cl.
CPC ............. H04N 7/183 (2013.01); H04N 23/54 (2023.01); H04N 23/56 (2023.01); H04N 23/695 (2023.01); H02J 1/00 (2013.01)

(58) Field of Classification Search
None
See application file for complete search history.

(56) References Cited

U.S. PATENT DOCUMENTS 3,892,234 A    7/1975  Jones
5,581,297 A *  12/1996 Koz ........................ H04N 7/18
                                          348/363
(Continued)

FOREIGN PATENT DOCUMENTS

WO    WO/2016/020677 A1    2/2016
WO    WO/2018/073575 A1    4/2018
WO    WO/2020/152471 A1    7/2020

OTHER PUBLICATIONS

International Search Report issued in International Application No. PCT/AU2021/050857 dated Oct. 22, 2021.
(Continued)

Primary Examiner — Rebecca A Volentine
(74) Attorney, Agent, or Firm — Vos-IP, LLC

(57) ABSTRACT

An underwater camera system comprising a remote station such as a boat a diver connection module located at the back of diver's helmet including a splitter box. High voltage transmission power and a fiber optics tether come into the box from the boat on the surface through the fiber optics which can be integral with, attached to or coextending with the umbilical cord. The voltage is dropped, the fiber optic signal is converted to USB, and the two are fed out to the camera module which is adjustably mounted on the side of the diver's helmet, to allow change of focus in the same line of sight as the diver's vision and allowing full handsfree use.

29 Claims, 13 Drawing Sheets

(51) Int. Cl.
*H04N 23/54* (2023.01)
*H04N 23/56* (2023.01)
*H04N 23/695* (2023.01)

(56) References Cited

U.S. PATENT DOCUMENTS

| | | | | |
|---|---|---|---|---|
| 6,008,780 | A * | 12/1999 | Clarke | B63C 11/14 |
| | | | | 2/430 |
| 6,895,961 | B1 | 5/2005 | Todorov | |
| 2019/0359302 | A1* | 11/2019 | Shiue | F16M 11/2021 |
| 2022/0094884 | A1* | 3/2022 | Kerr | H04N 23/51 |

OTHER PUBLICATIONS

International Preliminary Report on Patentability issued in International Application No. PCT/AU2021/050857 dated Feb. 7, 2023.

* cited by examiner

Mounting the camera and light of the underwater wearable camera system on the diver's helmet with fixed relative focus relative to the viewing focus of the diver through the visor of the diver helmet

Allowing adjustment in real time or before use to a predetermined focus distance relative to the diver by adjusting the relative mounting angle of the camera and light relative to the forward direction of the diver's helmet;

Allowing the diver to change direction of the camera and light while maintaining common focus with the diver's view by changing direction of the helmet and fixed mounting of the camera and light while retaining r5elative direction to the forward direction of the diver's helmet

FIGURE 13

UNDERWATER CAMERA SYSTEM

CROSS-REFERENCE TO RELATED APPLICATIONS

This application is a 371 National Phase Entry of International Patent Application No. PCT/AU2021/050857 filed on Aug. 5, 2021, which claims the benefit of Australian Patent Application No. 2020902751 filed on Aug. 5, 2020, the contents of which are incorporated herein by reference in their entirety.

FIELD OF THE INVENTION

The present invention relates to an underwater camera system and in particular to an underwater wearable camera system or underwater handsfree camera system for use in gathering photographic imagery and/or data imagery in an underwater setting.

The invention has been developed primarily for underwater usage by SCUBA divers in the depth of up to 200 meters but primarily in the 20 to 140 meter depths. The system can be used up to about 500 meters from a tethered boat. However, it will be appreciated that the invention is not limited to this particular field of use and could be used by deep sea diving up to 500 meters.

BACKGROUND OF THE INVENTION

Underwater handsfree camera systems can be of various sizes and shapes and due to their configuration incur different problems.

Generally, they use copper wire systems. Since it is important to maintain safety with power in water the power is restricted to 12 volts. This substantially restricts distance from the remote operating station to about 50 meters due to power loss.

Also, the present systems have a light and camera. However, it is necessary for the remote station to be advising the user of the effect of direction of the light to the captured visual image. This restricts the versatility and effective use of the known systems.

It can be seen that known prior art underwater wearable camera systems have the problems of:
 a. limitation of distance;
 b. not usable in deep water;
 c. requires large powered systems areas for deep use;
 d. not versatile or adaptable in user-controlled use of camera and light;
 e. no integration of camera, light, and power;
 f. not usable handsfree; and
 g. not usable without remote station control.

The present invention seeks to provide underwater wearable camera system, which will overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art in Australia or any other country.

SUMMARY OF THE INVENTION

The invention provides an underwater camera system comprising a camera system mountable on a diver and having a camera; and a light, a power system for powering the camera and the light; and a visual image capture system for capturing images by way of the camera and light. The system further can have an optical fiber and power line connecting the underwater wearable camera system on the diver to a remote station providing for power and communication and visual image transfer therebetween wherein the power system is at least partially remote from the diver.

The underwater camera system can include a tethered connection to at least a part of the remote station wherein the tethered remote station includes a boat on the water surface. This can allow the power system and the optical fiber to provide for a distance of operation of up to 500 meters between the remote station and the tethered diver.

The power system includes a supply at a higher transmission voltage than the safe low power in use voltage wherein the higher transmission power compensates for the energy loss caused by the distance of operation. Preferably the power system is a DC system. More preferably the power system includes a storage on the tethered remote station at 12 volts and a step up transformation to a higher voltage for transmission and loss over the power line to the diver and a transformation at the diver to a usable 12 volt system. The underwater camera system can advantageously have the higher transmission voltage is substantially at 48 volts DC.

The underwater camera system can have the camera and the light mounted in a camera system body allowing coordinated focus of the camera and the light.

The system includes a mounting for mounting the camera system body to a helmet of the diver. The mounting for the camera system body to the helmet of the diver provides fixed relative focus relative to the viewing focus of the diver through the visor of the diver helmet. The mounting of the camera system body to the helmet is adjustable to allow adjustment to a predetermined focus distance relative to the diver by adjusting the relative mounting angle of the camera and light relative to the forward direction of the diver's helmet.

The underwater camera system can preferably include a power system comprising a component of the power system with tether connection to wherein the tether connection.

Connections to the power line and optical fiber being through a transfer box mountable on the diver to allow free hand, arm and head movement to allow the diver to maintain common relative direction with the camera and light while maintaining common focus with the diver's view when the diver moves direction of the helmet.

The transfer box can be mountable on the rear of a diver's helmet wherein the diver has full and immediate control of directional control and maintained focus of camera, light, and diver's view.

According to the present invention, there is provided in one form an underwater wearable camera system, comprising a camera system mountable on the diver's protective helmet and having: a camera; and a light; a power system for powering the camera and the light; and a visual image capture system for capturing images by way of the camera and light; an optical fiber and power line connecting the underwater wearable camera system on the diver to a remote station providing for power and communication and visual image transfer therebetween wherein an umbilical cord tethers the diver to the remote station.

The tethered remote station can be a boat on the water surface.

The power system and the optical fiber provide for a distance of operation of up to 500 meters between the remote station and the tethered diver. The power system can include a supply at a higher transmission voltage than the safe low power in use voltage wherein the higher transmission power compensates for the energy loss caused by the distance of operation. In one form the power system can includes a storage on the tethered remote station, such as the boat, at 12 volts and a step-up transformation to a higher voltage for transmission and loss over the power line to the diver and a transformation at the diver to a usable 12 volt system. Preferably the higher transmission voltage is substantially at 48 volts DC.

The underwater wearable camera system can have:
a. a camera module having at least one body mountable on the side of the diver's helmet;
b. a diver connection module mountable at the rear of the diver's helmet to ensure balance and connectable to an umbilical cord connecting the diver to the tethered remote station; and
c. a camera module connection connecting the diver connection module to the camera module and closely following the perimeter of the diver's helmet to prevent fouling and snagging of the cord.

The mount on the helmet of the diver follows the movement of the user's head to direct the direction of the camera and the light.

Preferably the mount includes an adjustable bracket allowing the camera and light to substantially align with the user's line of sight. This allows the adjustment to be done prior to deployment as the screws will need to be tightened prior to use. Preferably the adjustable bracket of the mount allows an adjustment up to 20° left to right and can allow an adjustment up to 30° in elevation. Therefore, the mount adjustable bracket allows the camera and light to substantially prealigned with the user's line of sight to a required focus distance in the water.

The invention also provides for an underwater wearable camera system wherein the camera and the light are mounted in the camera module body in an adjacent and coplanar alignment to each other such that a single alteration of the camera module body to the forward viewing angle of the diver through a visor on the diver's helmet will alter the focus of the light and the camera to a required focus length of the diver's view.

The underwater wearable camera system can include transmission of power, communication and camera control and image. The communication can include connection to sensors for providing to the remote station one or more of depth, pressure, temperature, salinity, light metering, depth of view, light dispersion, water clarity, diver vital signs, and diver focus.

The invention also provides method of enabling an underwater wearable camera system for use in an extended distance from a tethered diver to a remote station including the steps of:
a. providing an underwater handsfree camera system mountable on the diver;
b. providing a transmission system using fiber optic cabling; and
c. providing a powering system using an increased power voltage for transmission and a low DC in use power by the underwater handsfree camera system on the diver.

This allows for the extended distance from a tethered diver to a remote station to be up to 500 meters.

The method of enabling an underwater wearable camera system can include the steps of:
a. mounting the camera and light of the underwater wearable camera system on the diver's helmet with fixed focus relative to the viewing focus of the diver through the visor of the diver helmet;
b. allowing adjustment to a predetermined focus distance relative to the diver by adjusting the relative mounting angle of the camera and light relative to the forward direction of the diver's helmet; and
c. allowing the diver to maintain common relative direction with the camera and light while maintaining common focus with the diver's view when the diver moves direction of the helmet;

wherein the diver has full and immediate control of directional control and maintained focus of camera, light and diver's view.

The underwater handsfree camera system of the invention can allow for ready operation of a camera system hands free and be maintained in a predetermined focus by the diver with full control of the camera, light with known camera image capture.

Other aspects of the invention are also disclosed.

BRIEF DESCRIPTION OF THE FIGURES

Notwithstanding any other forms which may fall within the scope of the present invention, preferred embodiments of the invention will now be described, by way of example only, with reference to the accompanying drawings in which:

FIG. 13 is a diagrammatic view of a method of enabling an underwater wearable camera system in accordance with

DETAILED DESCRIPTION OF THE PREFERRED EMBODIMENTS

Figure 1:
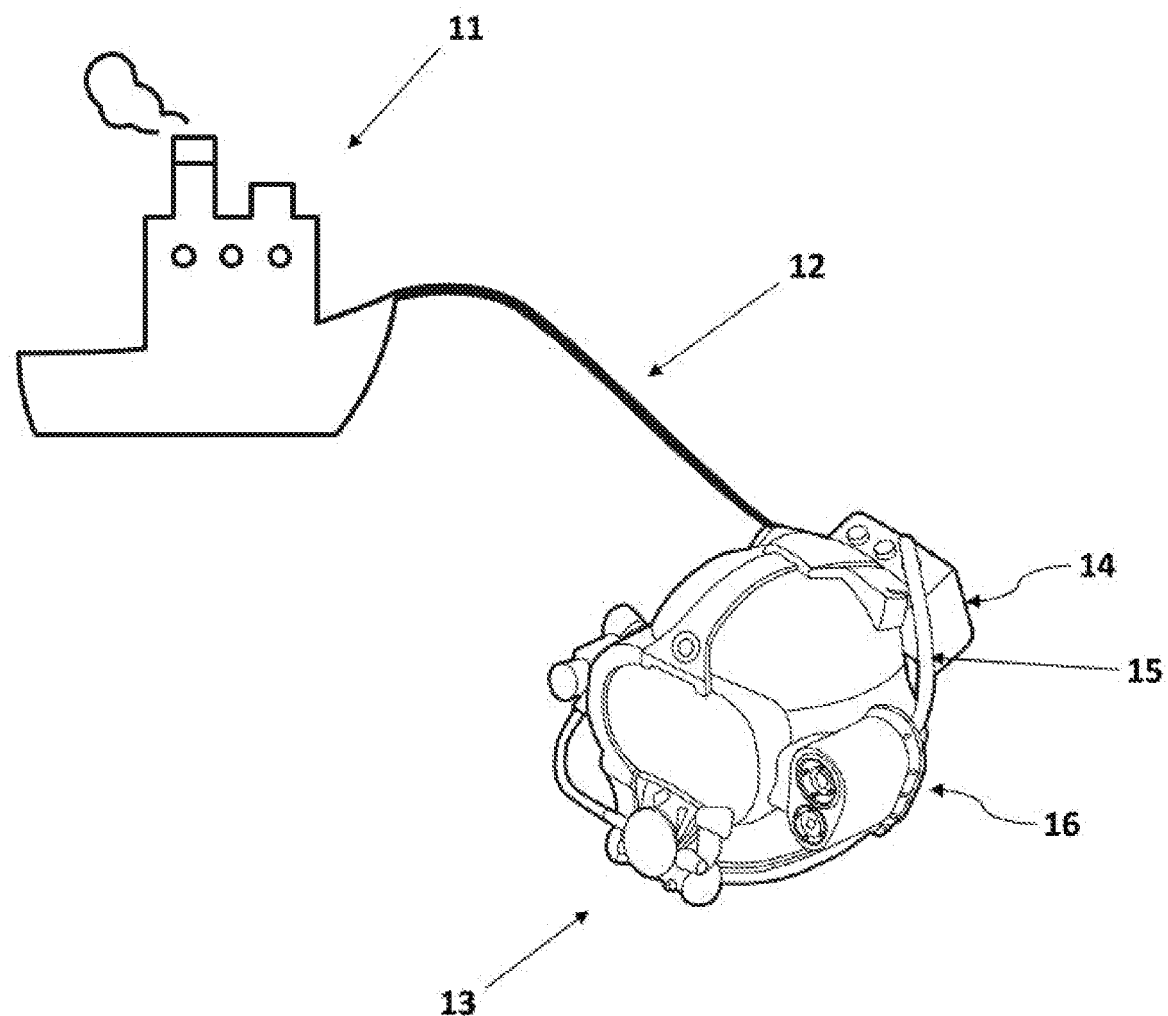
FIG. 1 is a diagrammatic view of an underwater handsfree camera system in accordance with a preferred embodiment of the present invention showing a underwater handsfree camera system body connected to a diver who is tethered to a remote station being a boat.

It should be noted in the following description that like or the same reference numerals in different embodiments denote the same or similar features.

Referring to the drawings and particularly FIGS. 1 to 7, there is shown an underwater wearable camera system comprising a camera module system (16) mountable on the diver's protective helmet (13) and having a camera (23) and a light (22) which is mounted in a body (20) that is elongated to fit along the side of the helmet. The general cross section of the body (20) is tear drop so as to fit the larger cylindrical portion of the camera (23) in top section and the smaller cylindrical section of the light (22) below such that they are substantially coplanar. In this way the forward facing of the camera is relatively fixed to the forward direction of the light.

A power system (14) is fitted at the rear of the helmet (13) and connected to umbilical cord which tethers the diver to the remote station (11) for powering the camera and the light. An optical fiber and power line (12) connects the underwater wearable camera system on the diver to the remote station while a camera module connection (15) connects to the camera module (16), providing for power and communication and visual image transfer therebetween.

Figure 2:
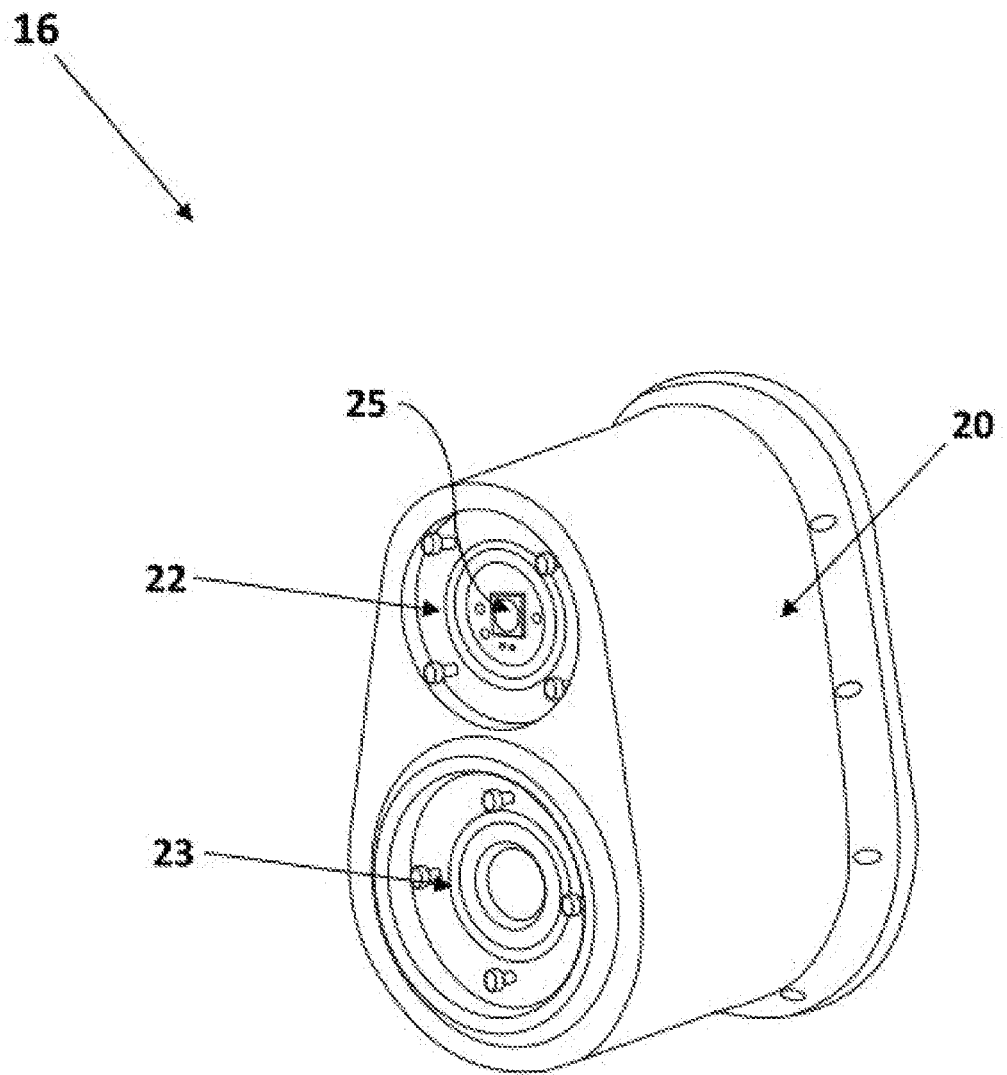
FIGS. 2 and 3 are front view and side exploded view of a camera module of the underwater handsfree camera system of FIG. 1 showing the camera and light.
Figure 3:
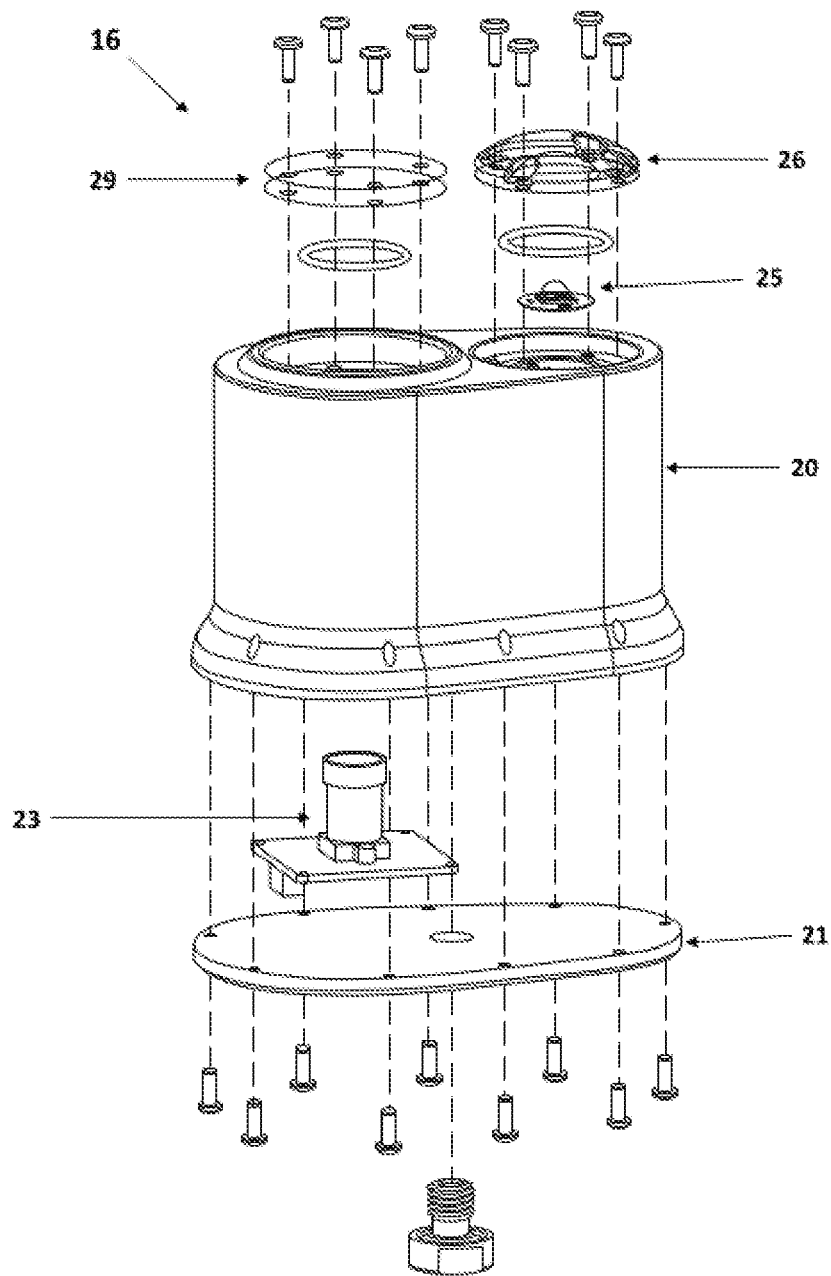

As shown in FIGS. 2 and 3 the camera module (16) has the camera (23) and the light (22) in a camera module body (20). The lights are LEDs mounted in the body (16) on a powered circuit board (25) and covered at the front with a lens covering (26) and at the rear by a closing plate (21). The camera (23) is fitted in the adjacent cylindrical spacing mounted in the body (16) on a powered board and covered at the front with a lens covering (29) and at the rear by a closing plate (21).

Creating of a waterproof housing that can handle deep waters and is also rugged to the tough conditions. The makeup of the device is the following:
thick, hard anodized aluminum housings;
O-ring seals; and
potted penetrators.

It is important to keep the body size of the underwater handsfree camera system (11) with the underwater wearable camera system being substantially in the range of the size of the helmet of a SCUBA diver. In this way the buoyancy is readily maintained and the user is not hindered by a large attachment. Further the helmet with body is readily moved by the user by simply moving their head and thereby the helmet and body.

Modularity

The system has been broken down into multiple modular components, allowing it to be adapted for specific conditions and applications. This also allows for possible future improvements to be easily integrated into a current model.

The three main constituent parts are as follows:

Remote station such as a boat (11) which can include a boat box. The box placed on the boat, provides the interfacing of the camera unit with a host computer and interfacing with the power supply.

Diver connection module (14) is located at the back of diver's helmet. The diver connection module includes a Splitter box. The high voltage transmission power and fiber optics come into the box from the boat (11) on the surface through the fiber optics (12) which can be integral with, attached to or coextending with the umbilical cord (12). Voltage is dropped, fiber optic signal is converted to USB, and the two are fed out to the camera module. Multiple other penetrator holes can be provided, to allow the addition of more lights or cameras.

Camera module (16) sits on the side of the diver's helmet, in the same line of sight as the diver's vision.

Power Supply

Streaming over longer distances is achieved by use of fiber optic cabling. This allows the length of operation to be extended far beyond anything available to traditional copper methods.

However, that distance therefore creates problems that need to be overcome. This includes the dramatic loss of power of distances, the functionality, and the importance in not hindering the user in an already dangerous location of 50 to 150 meters below the surface.

The electronics collects the data from the visual image capture and is connectable by connection (12) to transfer the data to a mother ship boat or remote station (11).

As the size of the underwater handsfree camera system does not generally provide sufficient space or weight to allow its own power source, it makes use of direct current supply directly from the boat (11) to the diver.

Multiple power supplies are used:
12 V to 48 V step-up supply inside boat box
48 V to 12 V step-down, 48 V to 5 V step-down inside splitter box (14) in the diver connection module Boats, generally, are fitted with 12 V batteries used for powering electrical circuits. The design allows for the 12 V to be piped into the boat box and stepped up to a suitable voltage where the power losses through the 150 m+ power cable underwater will be negligible. Roughly, we can expect about 3 V-6 V power loss through a 150 m cable. Hence, the voltage available at the splitter box should sit at 42 V-48 V.

48 V output of boat box (19) can be varied. 36 V-48 V output from boat box power supply will still provide sufficient power at the splitter box, i.e., At 36 V output, after 150 m we can expect to still have at least 30 V. This is still a high enough voltage for the splitter box supplies to drop down to 12 V and 5 V.

Figure 6:
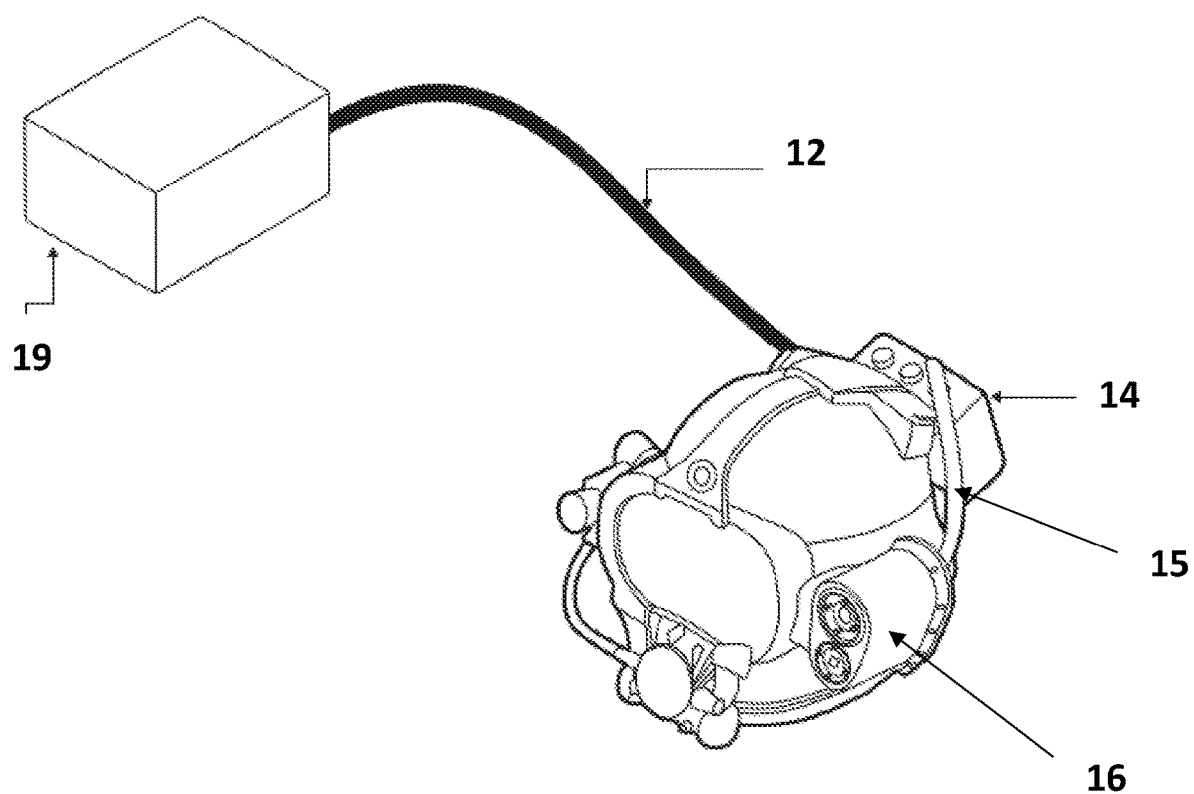
FIGS. 6 and 7 are a diagrammatic front perspective view and an overhead plan view of the connection of the diver to the remote station of the boat in an operational connection of underwater handsfree camera system of FIG. 1.
Figure 7:
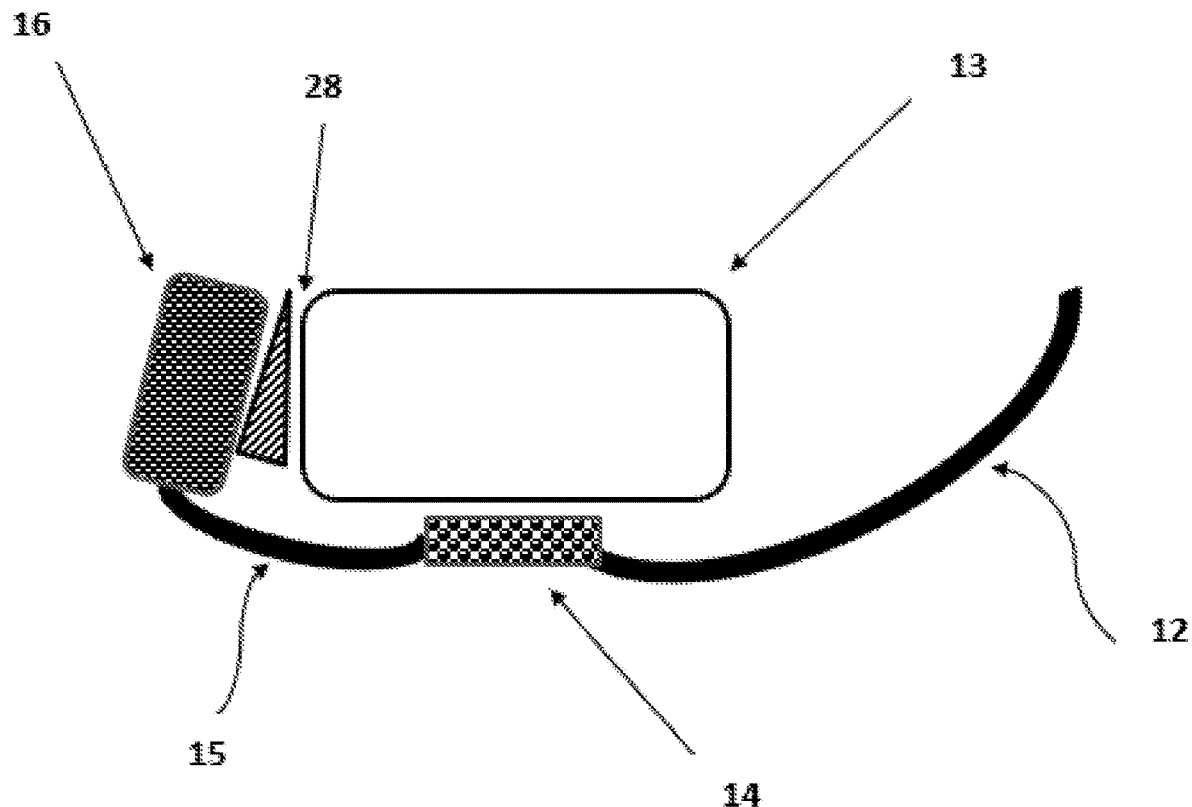
Figure 8:
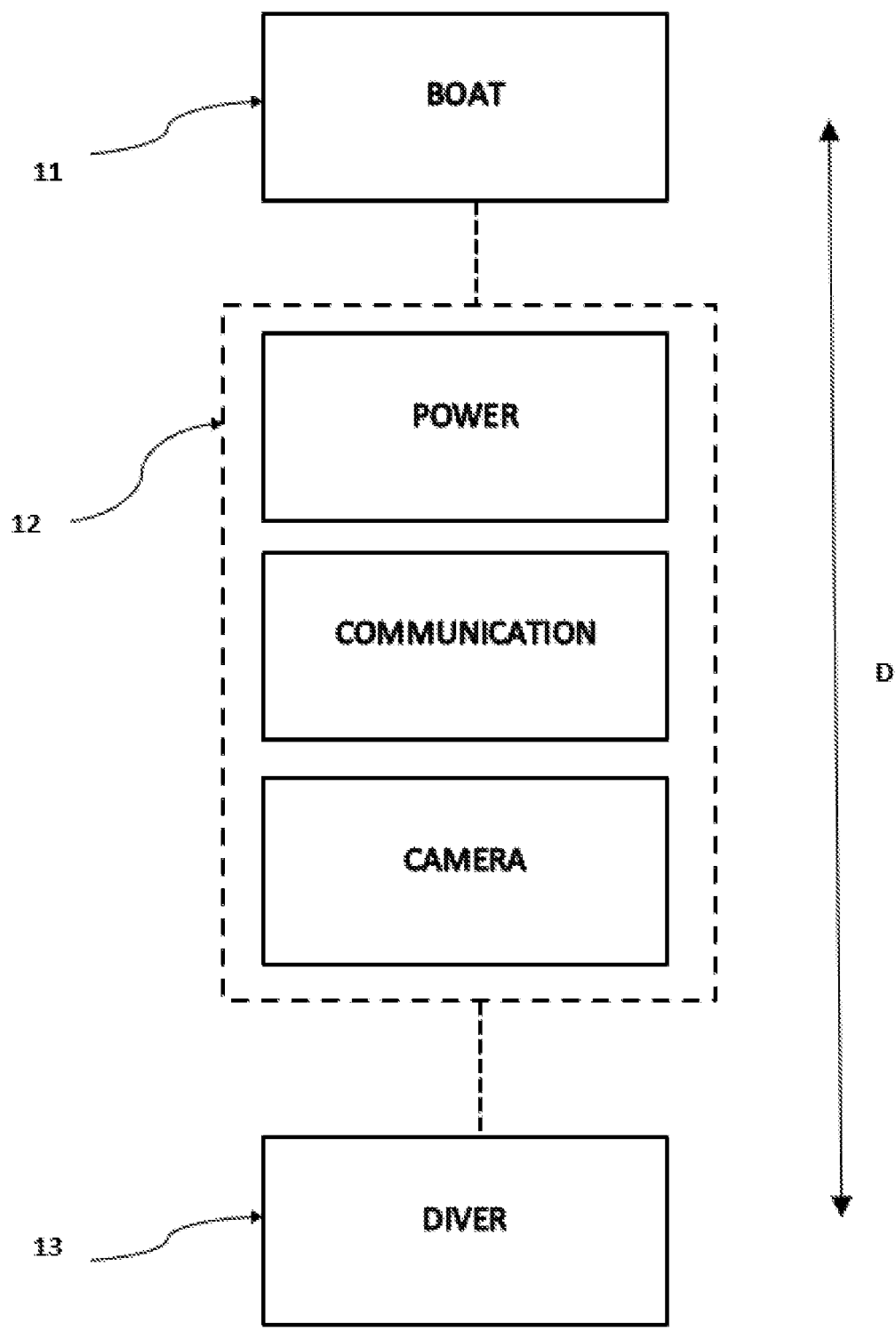
FIG. 8 is a diagrammatic view of the operational connection between the boat and the diver by the fiber optic and umbilical cord of the underwater handsfree camera system of FIG. 1.
Figure 9:
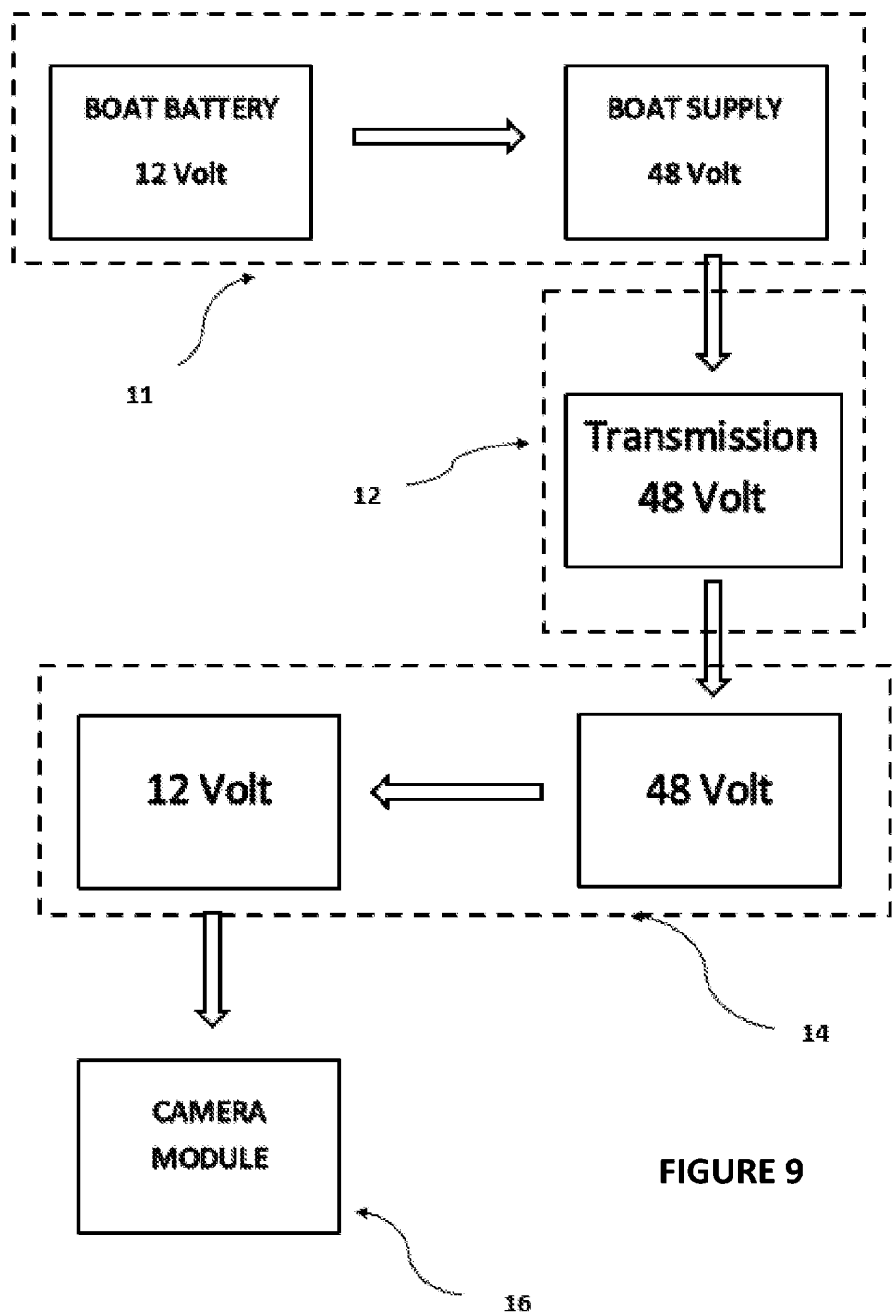
FIG. 9 is a diagrammatic view of the operational power connection between the boat and the diver by the fiber optic and umbilical cord of the underwater handsfree camera system of FIG. 1.
Figure 10:
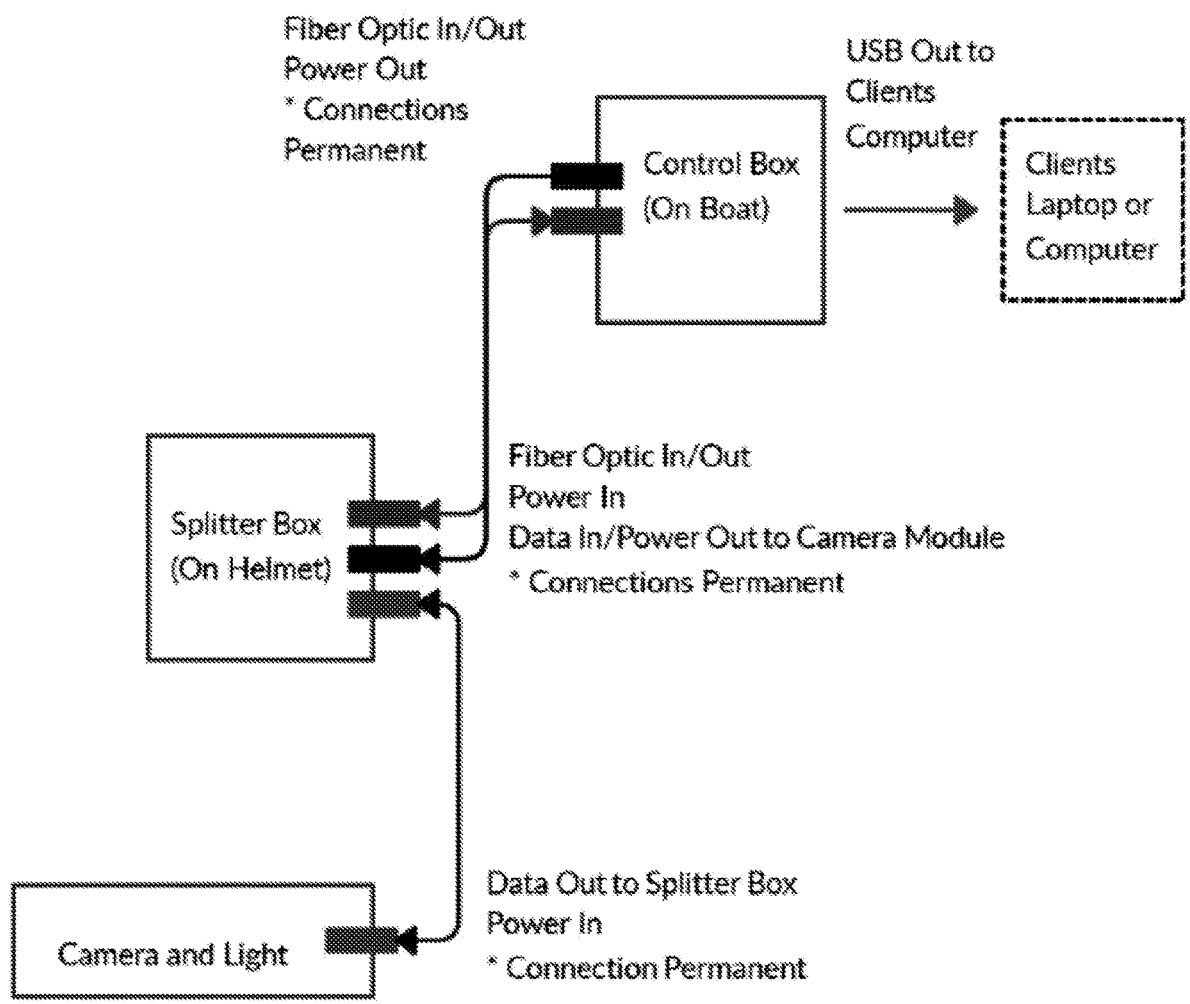
FIG. 10 is a diagrammatic view of the camera visual image connection between the boat and the diver by the fiber optic and umbilical cord of the underwater handsfree camera system of a first example of FIG. 1.
Figure 11:
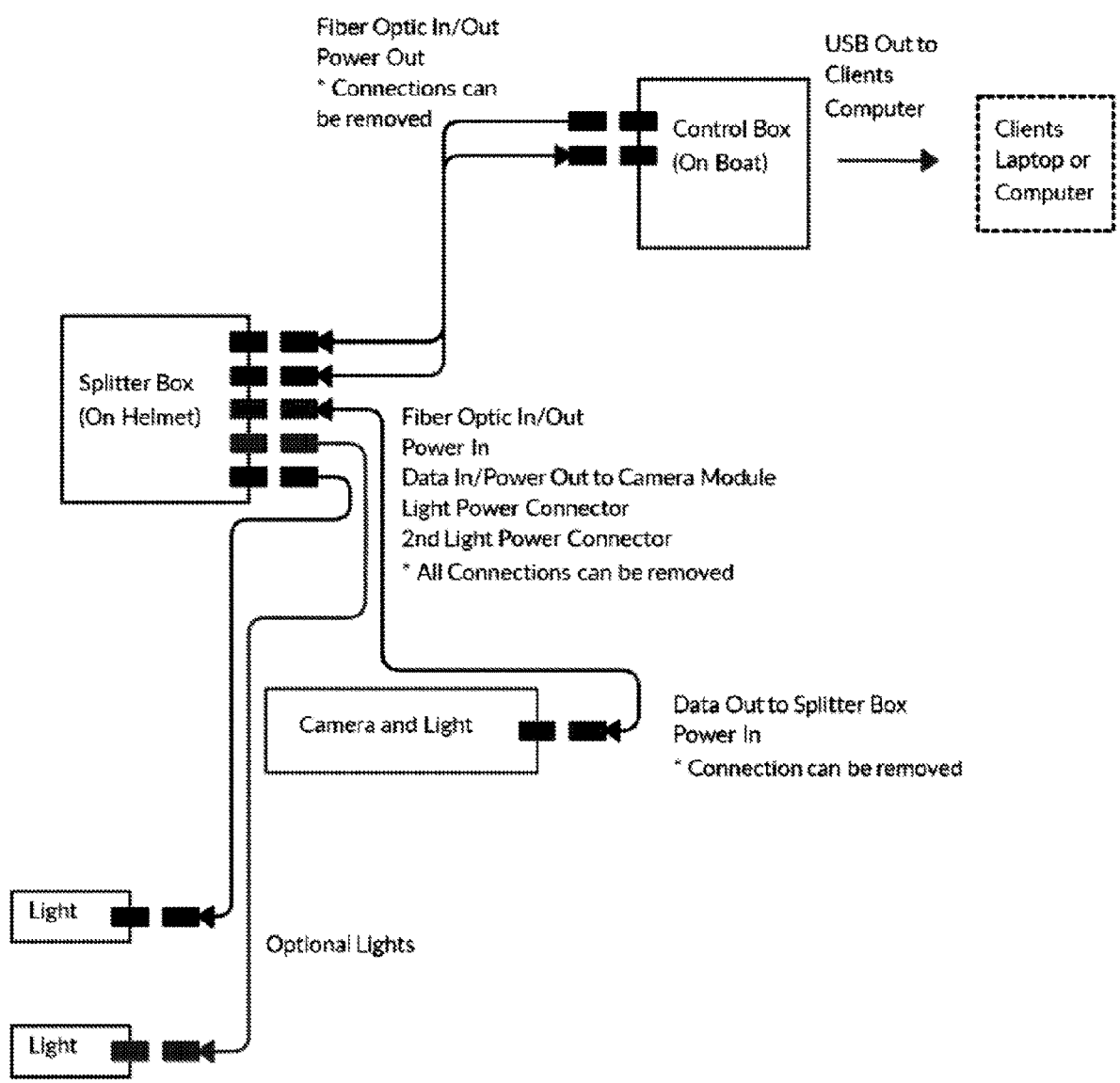
FIG. 11 is a diagrammatic view of the camera visual image connection between the boat and the diver by the fiber optic and umbilical cord of the underwater handsfree camera system of a second example of FIG. 1.
Figure 12:
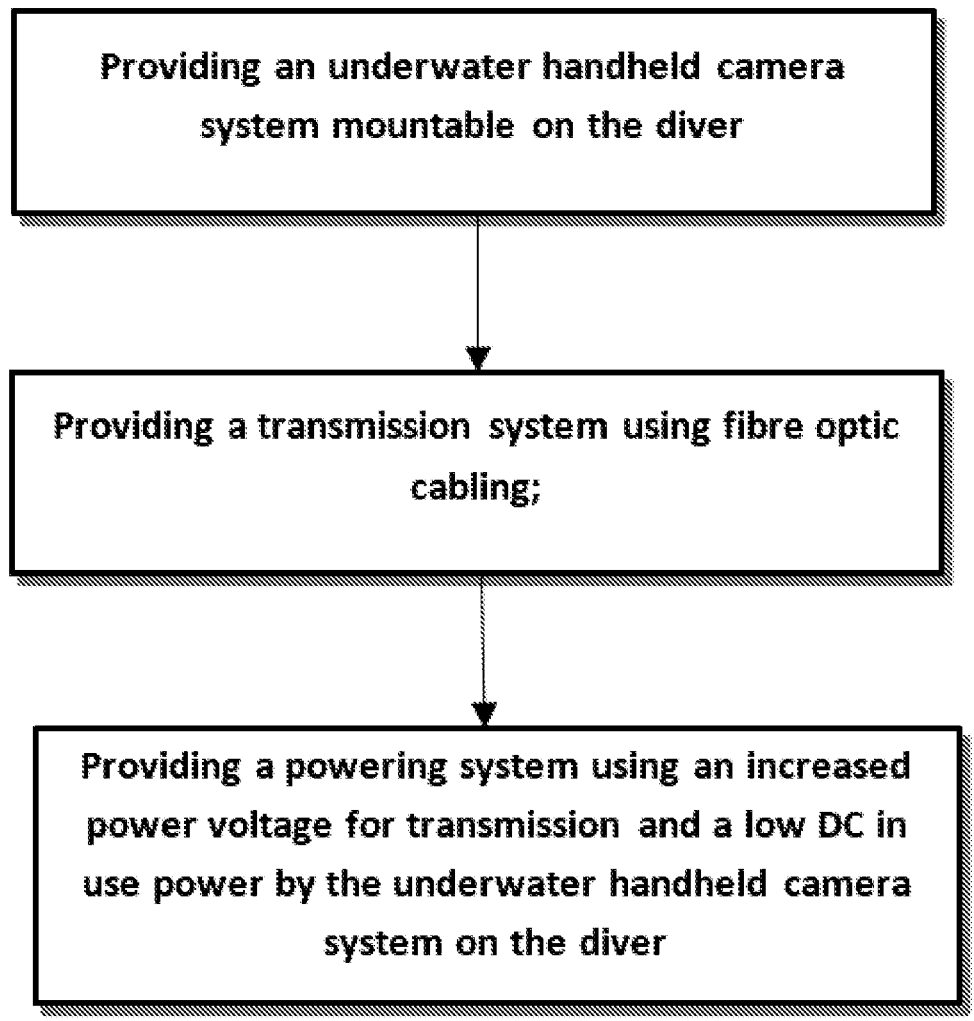
FIG. 12 is a diagrammatic view of a method of enabling an underwater wearable camera system in accordance with a preferred embodiment of the present invention by the steps of the connection in an extended distance from a tethered diver to a remote station.

As shown in FIGS. 6 and 7, the power system (14) for allowing the controllable use of the underwater handsfree camera system body is connected by power line in the umbilical cord (12) to the boat (11). By location at the back of the helmet (13) it is readily balanced and wiring (15) to the camera is close to the helmet to thereby avoid or fouling or snagging of the lines (15) or umbilical cord (12).

Visual Image Capture System

Cameras can be either stereoscopic or monoscopic. Cameras are located in the camera module (16) attached to the diver's helmet (13). It is connected by a camera alignment bracket (28) which is integral or attached to the mount of the camera body (16) mount.

The objective of camera placement is to make sure that the area of focus is about 2 meters from the camera. This is to ensure the best quality image is captured. Although focus on 2 meters or less than 2 meters is planned the cameras will capture objects that are further away than 2 meters.

Figure 4:
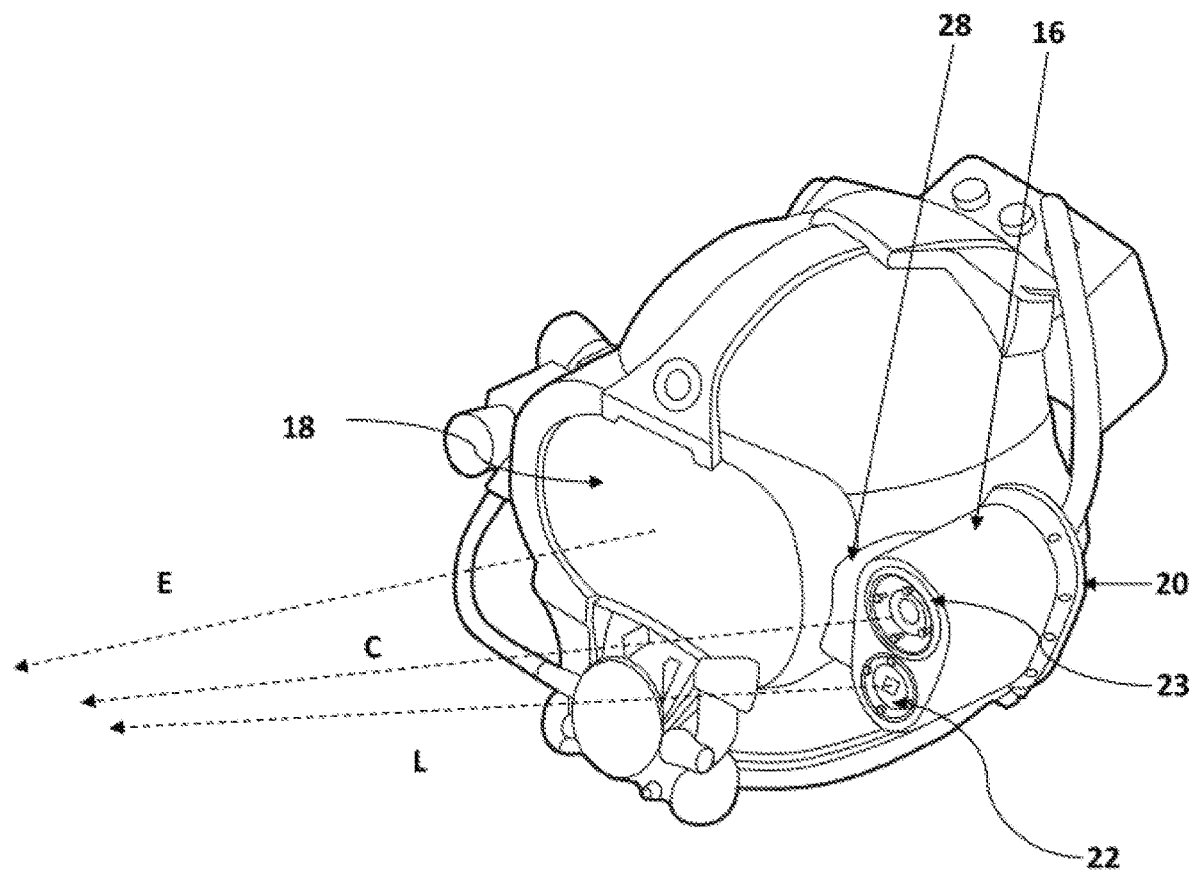
FIGS. 4 and 5 are front perspective view and overhead diagrammatic plan view of the mounting of the camera module on the diver's helmet and the relative orientation of the camera and light to the diver's forward view through the front visor of the diver's helmet to a predetermined focus length required in the use of the underwater handsfree camera system.
Figure 5:
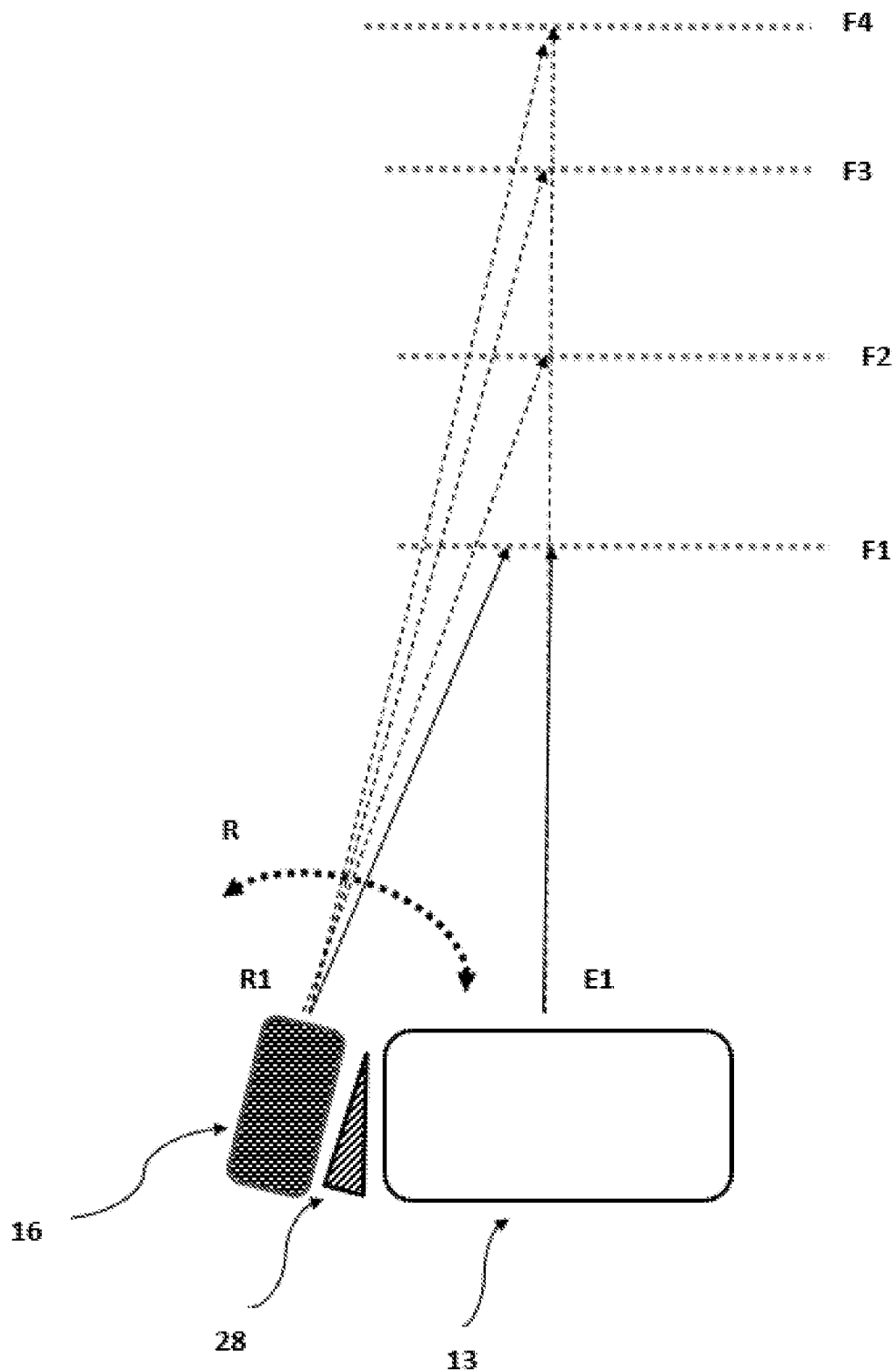

Further as shown in FIGS. 4 and 5, it is important to have the spacing of the cameras to the light and to the user's eyes. It is important that the location of the camera (23) is linked to the light (22) and the divers view are linked to each other to provide an effective coordinated focused effect of the combination of the line of sight of the diver along line E, the camera along line C, and the light along line L.

However as per FIG. 5 prior to entering the water the diver can select focus of the camera system including the camera (23) and the light (22). The adjustable bracket of the mount allows an adjustment up to 30° left to right and allows an adjustment up to 20° in elevation. Focus can be selected at any one of F1, F2, F3, or F4 or there could be a mount that allows continuous focus at any position in this range. Generally, focus is at 2 meters. However due to the depth, the clarity and the need of the diver, this distance could be reduced or increased around this 2-meter distance. By pre-selecting the focus, the camera module (16) with the camera (23) and light (22) can be focused relative to the view of the diver along sightline E1 at the predetermine focal distance by adjustment of the angle R of the module (16) to the diver's helmet. This is facilitated by the camera alignment bracket (28) integral or attached to the camera module. By the camera and light being in fixed alignment in the module the adjustment to focus all three elements is simplified.

Further by the prefixed focus of the camera and light relative to the fixed focus is simply used by the movement of the diver's helmet. That is if the diver is focused two meters directly ahead, that same fixed two meter focus follows the divers head movement and is operative in the new direction of line of sight E of the diver (e.g., 45° left). This eliminates the need to refocus the light the camera to the new direction.

Clearly a person skilled in the art would also see many other improvements that are novel and inventive, and these are included in the scope of the invention.

Interpretation

Embodiments

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first," "second," "third," etc., to describe a common object, merely indicate that different instances of like objects are being referred to and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures, and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward," "rearward," "radially," "peripherally," "upwardly," "downwardly," and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e., to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

"Camera" can mean a visual image camera or a camera that operates in a near visual image frequency range such as infrared or ultraviolet.

"Image" can be a photographic image capturing visual image digitally or otherwise or an image in a near visual image frequency range such as infrared or ultraviolet.

INDUSTRIAL APPLICABILITY

It is apparent from the above, that the arrangements described are applicable to the underwater handsfree camera system and underwater wearable camera system industries.

What is claimed is:

1. An underwater camera system comprising:
   (a) a camera system mountable on a diver and having:
      (i) a camera; and
      (ii) a light;
   (b) a power system for powering the camera and the light;
   (c) a visual image capture system for capturing images by way of the camera and light;
   (d) an optical fiber and power line connecting the underwater wearable camera system on the diver to a remote station providing for power and communication and visual image transfer therebetween; and
   (e) wherein the power system is a DC system which includes a storage on a tethered remote station at 12 volts and a step-up transformation to a higher voltage for transmission and loss over the power line to the diver and a transformation at the diver to a safe usable 12-volt system.

2. An underwater camera system according to claim 1 wherein the tethered remote station includes a boat on the water surface.

3. An underwater camera system according to claim 2 wherein the power system and the optical fiber provide for a distance of operation of up to 500 meters between the remote station and the tethered diver.

4. An underwater camera system according to claim 1 wherein the higher voltage is substantially at 48 volts DC.

5. An underwater camera system according to claim 1 wherein the camera and the light are mounted in a camera system body allowing coordinated focus of the camera and the light.

6. An underwater camera system according to claim 5 wherein the system includes a mounting for mounting the camera system body to a helmet of the diver.

7. An underwater camera system according to claim 6 wherein the mounting for the camera system body to the helmet of the diver provides fixed relative focus relative to the viewing focus of the diver through a visor of the diver helmet.

8. An underwater camera system according to claim 7 wherein the mounting of the camera system body to the helmet is adjustable to allow adjustment to a predetermined focus distance relative to the diver by adjusting the relative mounting angle of the camera and light relative to the forward direction of the diver's helmet.

9. An underwater camera system according to claim 8 comprising a component of the power system being connected along a tether connection to the tethered remote station.

10. An underwater camera system according to claim 9 including connections to the power line and optical fiber being through a transfer box mountable on the diver to allow free hand, arm and head movement to allow the diver to maintain fixed relative direction of the camera and the light so as to maintain common focus with the diver's view when the diver moves direction of the helmet.

11. An underwater camera system according to claim 10 including the transfer box being mountable on the rear of a diver's helmet wherein the diver has full directional control and maintained focus of camera, light, and diver's view.

12. An underwater camera system according to claim 1 which is wearable by a diver including:
   (a) a camera module having at least one body mountable on a side of a diver's helmet;
   (b) a diver connection module mountable at the rear of the diver's helmet to ensure balance and connectability to an umbilical cord connecting the diver to the tethered remote station; and
   (c) a camera module connection including a cable connecting the diver connection module to the camera module and closely following the perimeter of the diver's helmet to prevent fouling and snagging of the cable.

13. An underwater wearable camera system comprising:
   (a) a camera system mountable on a diver's protective helmet and having:
      (i) a camera; and
      (ii) a light;
   (b) a power system for powering the camera and the light;
   (c) a visual image capture system for capturing images by way of the camera and light;
   (d) an optical fiber and power line connecting the underwater wearable camera system on the diver to a remote station providing for power and communication and visual image transfer therebetween;
   (e) wherein an umbilical cord tethers the diver to the remote station; and
   (f) wherein the power system is a DC system which includes a storage on a tethered remote station at 12 volts and a step-up transformation to a higher voltage for transmission and loss over the power line to the diver and a transformation at the diver to a safe usable 12-volt system.

14. An underwater wearable camera system according to claim 13 wherein the tethered remote station is a boat on the water surface.

15. An underwater wearable camera system according to claim 13 wherein the power system and the optical fiber provide for a distance of operation of up to 500 meters between the remote station and the diver.

16. An underwater wearable camera system according to claim 13 wherein the higher voltage is substantially at 48 volts DC.

17. An underwater wearable camera system according to claim 13 including:
   (a) a camera module having at least one body mountable on the side of the diver's protective helmet;
   (b) a diver connection module mountable at the rear of the diver's protective helmet to ensure balance and connectability to an umbilical cord connecting the diver to the tethered remote station; and
   (c) a camera module connection including a cable connecting the diver connection module to the camera module and closely following the perimeter of the diver's helmet to prevent fouling and snagging of the cable.

18. An underwater wearable camera system according to claim 17 including a mount on the diver's protective helmet of wherein the body is secured to the mount and wherein the movement of the diver's protective helmet directs the direction of the camera.

19. An underwater wearable camera system according to claim 18 wherein the mount includes an adjustable bracket allowing the camera and light to substantially align with a line of sight of a user.

20. An underwater wearable camera system according to claim 18 wherein an adjustable bracket of the mount allows an adjustment up to 30° left to right.

21. An underwater wearable camera system according to claim 18 wherein an adjustable bracket of the mount allows an adjustment up to 20° in elevation.

22. An underwater wearable camera system according to claim 18 wherein the mount includes an adjustable bracket allowing the camera and light to substantially prealign with a line of sight of a user to a required focus distance in water.

23. An underwater wearable camera system according to claim 18 wherein the camera and the light are mounted in the camera module body in an adjacent and coplanar alignment to each other such that a single alteration of the camera module body to the forward viewing angle of the diver through a visor on the diver's helmet will alter the focus of the light and the camera to a required focus length of the diver's view.

24. An underwater wearable camera system according to claim 17 wherein a front transparent panel of the body has a lens effect.

25. An underwater wearable camera system according to claim 13 wherein the system includes transmission of power, communication and camera control and image.

26. An underwater wearable camera system according to claim 13 wherein the communication can include connection to sensors for providing to the remote station one or more of:
   (a) depth;
   (b) temperature;
   (c) salinity;
   (d) pressure;
   (e) light metering;
   (f) depth of view;
   (g) light dispersion;
   (h) water clarity;
   (i) diver vital signs; and
   (j) diver focus.

27. A method of enabling an underwater wearable camera system for use in an extended distance from a tethered diver to a remote station including the steps of:
   (a) providing an underwater handsfree camera system mountable on the diver;
   (b) providing a transmission system using fiber optic cabling;
   (c) providing a powering system using an increased power voltage for transmission and a low DC in use power by the underwater handsfree camera system on the diver; and
   (d) wherein the power system is a DC system which includes a storage on a tethered remote station at 12 volts and a step-up transformation to a higher voltage for transmission and loss over the power line to the diver and a transformation at the diver to a safe usable 12-volt system.

28. A method according to claim 27 wherein the extended distance from a tethered diver to a remote station is up to 500 meters.

29. A method of enabling an underwater wearable camera system according to claim 28 wherein the undertaking of visual capture includes the steps of:
   (a) mounting the camera and light of the underwater wearable camera system on the diver's helmet with fixed relative focus relative to the viewing focus of the diver through the visor of the diver helmet;
   (b) allowing adjustment to a predetermined focus distance relative to the diver by adjusting the relative mounting angle of the camera and light relative to the forward direction of the diver's helmet; and
   (c) allowing the diver to maintain common relative direction with the camera and light while maintaining common focus with the diver's view when the diver moves direction of the helmet;
   wherein the diver has full and immediate control of directional control and maintained focus of camera, light, and diver's view.

* * * * *